United States Patent Office.

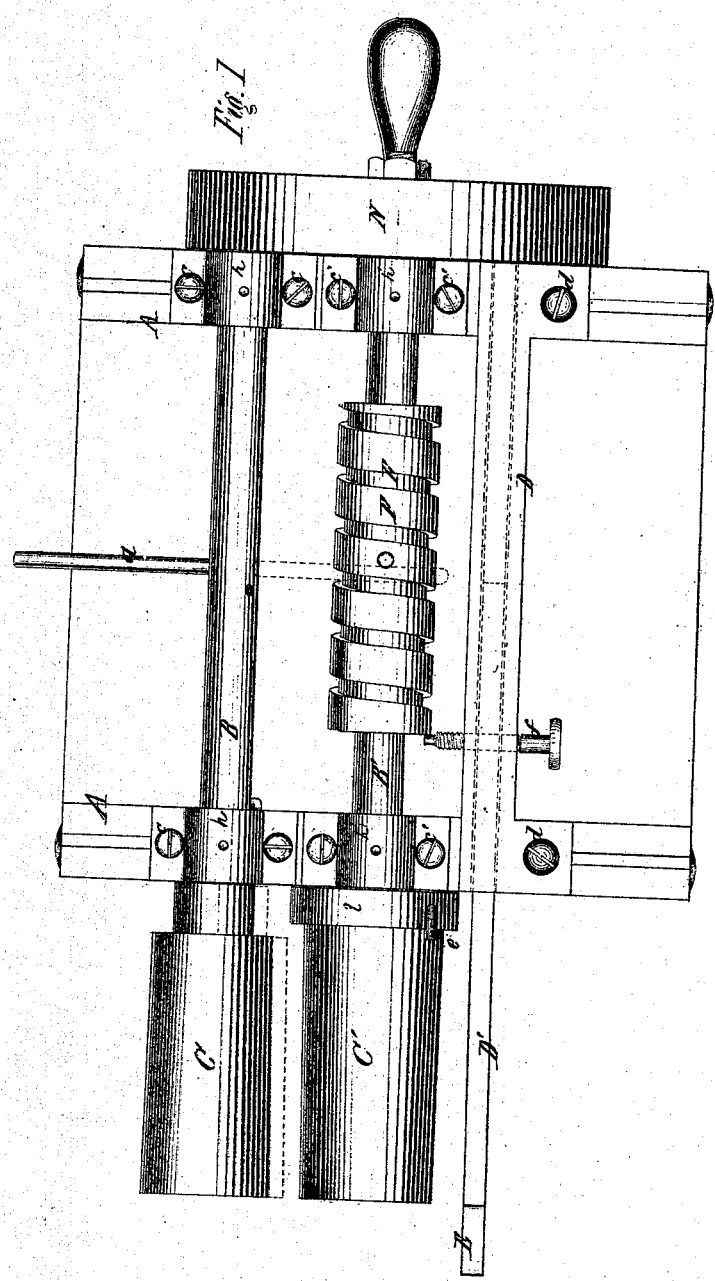

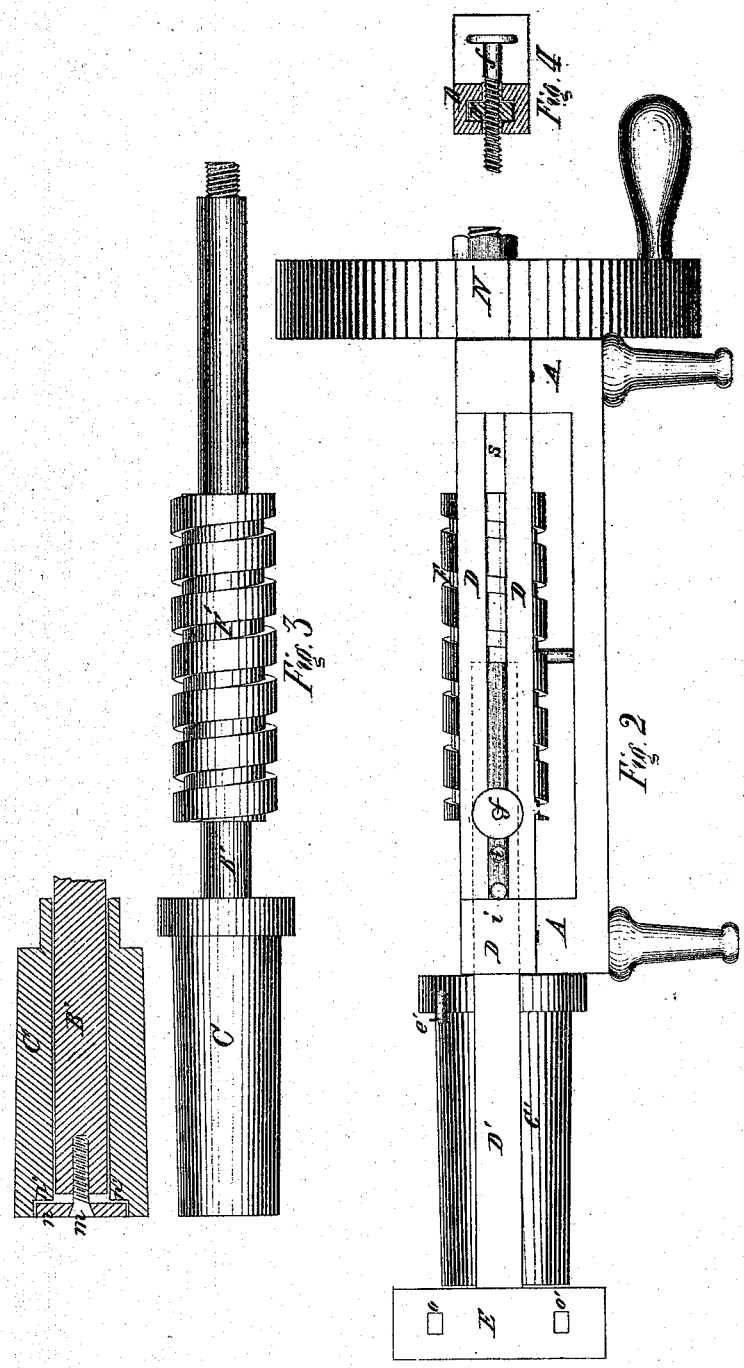

ALBERT HEBBARD, OF SPRINGFIELD, MASSACHUSETTS.

Letters Patent No. 100,400, dated March 1, 1870.

IMPROVED MACHINE FOR MAKING CAR-SPRINGS.

The Schedule referred to in these Letters Patent and making part of the same

*To all whom it may concern:*

Be it known that I, ALBERT HEBBARD, of Springfield, in the county of Hampden, and State of Massachusetts, have invented a new and useful Machine for Making Car-Springs; and I do hereby declare that the following is a full, clear, and exact description thereof, reference being had to the accompanying drawings making a part of this specification, and to the letters of reference marked thereon, in which—

Figure 1, plate 1 is a plan view of my invention;

Figure 2, plate 2, is a side elevation;

Figure 3 is a side view of a roll, with a right hand spiral groove;

Figure 4 is a vertical transverse section of the guide-bar and its socket, through line H I of fig. 2; and Figure 5 is a longitudinal section of the presser-roll, through line G of fig. 1.

My invention relates to a device for making the car-spring for which Letters Patent were granted me dated March 13, 1866; and consists of a roll which is tapered or smallest at the outer end, said roll being attached to a shaft resting in proper bearings, and the roll has a small projection or hook at its inner or largest end, and the shaft to which the roll is attached has a spiral groove made thereon.

The guide-bar, having suitable guiding-holes made at one end, slides to and fro longitudinally in a socket made in a larger bar, and near the inner end of the guide-bar are suitable holes, which are threaded, and through one of them is turned a screw, the inner end of which is inserted into the spiral groove, so that when a rotary motion is given to the shaft having the spiral groove thereon the said screw is carried along in a longitudinal direction, and with it the guide-bar.

Another shaft is placed parallel to the first, and also resting in suitable bearings, and upon the outer end of this shaft is placed another roll, which is eccentric with its said shaft; and the line of taper of this roll is parallel to the line of taper of the first roll, that is to say, the outer end of the second roll is larger than the inner end, and the second roll is made to revolve upon its shaft, while the first roll is permanent upon and only revolves with its shaft.

That others skilled in the art may be able to make and use my invention, I will proceed to describe its construction and the mode of its operation.

In the drawings—

A A represent the beds or ways in which the shafts B and B' have their bearings, and they are secured in their said bearings by means of the caps $h$ and $h'$, which are made fast by the screws $c$ and $c'$.

The shaft B' has the spiral groove F made thereon, and the roll C' is made permanent upon the shaft B', and at the base or inner end of the roll C' is the projecting annular flange $l$, to which is secured in any suitable and proper manner the hook or projection $e'$. The roll C' is tapered, being smallest at its outer end.

To the shaft B is secured the roll C, the outer end of the shaft being made eccentric with its main portion, and the roll C secured thereon, as shown in fig. 5, so that said roll may revolve freely upon its shaft.

By reference to fig. 5 it will be seen that B' is the shaft, C is the roll, in the outer end of which is a circular recess made, having a shoulder at $n'$.

A disk or washer, $n$, fits the said recess, and the roll C being placed upon the shaft B', a screw, $m$, is turned into the threaded hole made in the end of the shaft B', through the disk $n$, said disk having first been inserted in the recess in the end of the roll C. The roll C is largest at the outer end, and is tapered toward the inner end upon the same line of taper as the roll C'.

A bar, D, is secured to the beds A by means of the screws $d$, and in the bar D is a longitudinal groove or socket, shown more fully in fig. 4, in which socket fits properly the guide-bar D', having the part E thereon, in which are the holes $o$ $o'$.

Holes which have a screw-thread made therein are made in the guide-bar D' at $i$ $i$, into one of which is turned the screw $f$, the end of which protrudes sufficiently through the bar to enter the spiral groove F.

A longitudinal horizontal slot, $s$, is made along the bar D, in which moves longitudinally the screw $f$ when the machine is put in operation.

An arm or lever, $a$, is attached to the shaft B, by means of which said shaft may be turned about half way around in its bearings, throwing the eccentric roll C either near to or further from the roll C', and a rotary motion may be given to the shaft B' by power applied to the pulley N.

In practice the beds A A would be grooved, as shown in dotted lines in fig. 2, and the bar D have correspondingly-shaped projections thereon, which would operate horizontally in said grooves, the said bar being secured in any desired position by set-screws or their equivalents.

I will now describe the operation of my invention.

The guide D' is moved in until the hole $o$ in the part E is opposite the hook or projection $e'$.

The piece of steel of the proper size, of which the spring is to be made, is properly tapered at each end, and is heated to the desired degree, and one of the tapered ends is passed through the hole $o$, the extreme end of said tapered part resting between the projection $e'$ and the roll C'.

Power is then applied to the pulley N and the shaft B' rotated, when the end of the screw $f$ rides along in the spiral groove F, carrying out the guide-bar D' at a uniform rate of speed.

The red-hot steel is wound or coiled around the rotating roll C', while the holes $o$, or one of them, through which the steel is passing as it is wound, carries the steel out toward the end of the roll C' until the end of the screw runs out of the end of the spiral groove, when by a partial revolution of the shaft B' the tapered end of the steel is wound square.

When the tapered end of the steel is passed through the hole o and under the projection e', and the process of winding begins, the arm a is thrown over to the position shown in dotted lines in fig. 1, which also throws the eccentric roll C nearer to the roll C', as shown by the dotted lines also in fig. 1, and in that position the roll C presses against the steel which is being wound, keeping it close to said roll C', so that the spring when coiled shall be of the proper size.

When the operation of winding is completed the arm a is thrown back to bring the eccentric presser-roll back further from the roll C', so that the coiled spring may then be readily slipped off the tapered roll C'.

The car-springs are made in nests, usually to the number of four, and each spring, commencing with the largest, is wound in an opposite direction; that is to say, the largest spring is wound and the next smaller spring is wound in the opposite direction by means of the roll and spiral groove shown in fig. 3, and of a size to just fit within the first or largest spring. The next smaller spring is wound in the same direction as the first and is placed within the second, and the fourth is wound in the same direction as the second and placed within the third.

As all the springs are tapered from being wound upon the tapered roll C', it is quite easy to place them one within the other; whereas if they were straight it would be a matter of some difficulty to place them one within the other and still have them fit properly.

In winding upon the roll, and by the spiral groove shown in fig. 3, the shaft B and the bar D are made to change places, the bar D being placed where the shaft B is shown in fig. 1, but upside down, so that the hole o' shall be uppermost when it is ready for use.

Any number of holes i may be made in the bar D', so that the screw f may be set for any desired length of spring, and any number of holes o may be made in the part E to get the best elevation of the steel for winding.

Having thus described my invention,

What I claim as new, and desire to secure by Letters Patent, is—

The tapered roll C', having the projection stop e' thereon, or its equivalent, in combination with the spiral groove F, the guide-bar D', and the presser-roll C, all constructed and operating substantially as described.

ALBERT HEBBARD.

Witnesses:
T. A. CURTIS,
C. E. BUCKLAND.